Feb. 10, 1970  H. LIST ET AL  3,495,102
PIEZOELECTRIC TRANSDUCER
Filed July 11, 1967  4 Sheets-Sheet 1

Inventors
H. List
R. Zeiringer
R. Hatschek
By Watson, Cole, Grindle & Watson Atty.

Feb. 10, 1970     H. LIST ET AL     3,495,102

PIEZOELECTRIC TRANSDUCER

Filed July 11, 1967     4 Sheets-Sheet 4

Inventors
H. List
R. Zeiringer
R. Hatschek
By Watson, Cole, Grindle & Watson Attys.

United States Patent Office 3,495,102
Patented Feb. 10, 1970

3,495,102
PIEZOELECTRIC TRANSDUCER
Hans List, 126 Heinrichstrasse, Graz, Austria; Rudolf Zeiringer, Graz, Austria; and Rudolf Hatschek, Fribourg, Switzerland; said Zeiringer and Hatschek assignors to said List
Filed July 11, 1967, Ser. No. 652,504
Claims priority, application Austria, July 12, 1966, 6,691/66
Int. Cl. H01v 7/00
U.S. Cl. 310—8.7                                                6 Claims

ABSTRACT OF THE DISCLOSURE

A piezoelectric transducer having an element to measure pressure and comprising an abutment, a prestressing sleeve, a housing with the element composed of two electrodes, external connections and two conductors electrically insulated from the housing and the abutment.

---

The invention relates to a piezoelectric transducer whose measuring element consisting of piezoelectric material and subject to the measuring pressure is supported by an abutment and encompassed by a prestressing sleeve attached to the latter and provided with two collector electrodes or groups of collector electrodes for the electric charge produced by the measuring pressure.

These conventional transducers both include piezoelectric pickups, for example for the measurement of the pressure distribution in the cylinders of an internal combustion engine, such as are used for the measurement of oscillations of machines and vehicles, and piezoelectric dynamometers as used for example as load-measuring photocells primarily for the measurement of rapidly varying forces.

Pressure is frequently measured not only for the purpose of determining individual pressures and their time slop, but also for measuring differential pressures. With a known measuring device, two individual pressures are measured by means of pickups of identical sensitivity comprising connections of opposite poles, the signals of which are jointly fed to an electrometer used as a measuring instrument. The charges produced by the two pickups are thereby subtractively superimposed so as to permit direct reading of the pressure difference. However, since only pickups with homopolar connections are available in the common trade, the operation of this known measuring device requires an expensive special type of pickup. The use of two standard type pickups whose positive poles are always grounded, calls for a relatively expensive electronic circuit for the formation of the difference.

Similar problems arise also where a plurality of acceleometers are used simultaneously. During tests made for the purpose of determining oscillations of vehicles in several places simultaneously, the jointly grounded piezoelectric accelerometers were found to interfere with one another, obviously due to the joint grounding of the accelerometers.

It is the purpose of this invention to eliminate these difficulties. The object of the invention is attained with the use of a piezoelectric transducer of the type hereabove described by insulating the two collector electrodes or groups of collector electrodes electrically from the transducer housing and the abutment and by connecting them electrically with separate external connections via individual conductors electrically insulated from each other and from the transducer housing and the abutment. Consequently, the measuring circuit is by no means limited by the polarity of the connections. Moreover, such interferences as may be due to the grounding of the transducers are thereby eliminated so that precise measuring results are assured even with the use of a plurality of transducers. At the same time, the design of the transducer according to the invention takes the requirements of a highly productive serial production into account.

A preferred embodiment of the invention provides for a transducer comprising an abutment having a through bore extending in a longitudinal direction and continued in the measuring element and terminating with the connecting electrode located closest to the bottom of the prestressing sleeve, wherein at least the individual conductor originating with this electrode extends through the said bore. This arrangement greatly simplifies the connection of the collector electrodes which is thus independent of the number of disk-shaped elements constituting the piezoelectric element.

According to another feature of the invention the longitudinal bore can be laterally offset towards the center of the abutment, an equally off-center parallel second longitudinal bore being provided, extending through the abutment and an insulating disk adjoining the inner front face of the latter, and terminating with the collector electrode farthest from the bottom of the prestressing sleeve. Each of the single conductors emerging from the collector electrode extends through one of the longitudinal bores preferably lined with insulating tubes and is connected to the insulated external connections provided at the free end of each longitudinal bore. Mainly from the manufacturing point of view, this design offers a considerable advantage insofar as the longitudinal bore and the amounts provided therein, such as for example, threads for the attachment of the connecting elements or connecting bushes for the measuring leads, can be machined in a single operation. Since the longitudinal bores are preferably lined with insulating tubes, no insulation will be required for the individual conductors connecting the electrodes with the connecting elements.

According to another embodiment of the invention the longitudinal bore of the transducer extends in a central direction and includes the two single conductors, the conductor emerging from the collector electrode closest to the bottom of the prestressing sleeve extending through the other collector electrode and such intermediate electrodes as may be provided between the layers of the piezoelectric element. With this design it will be necessary to use insulated conductors in order to positively preclude earth short circuits. The central arrangement of the longitudinal bore facilitates the assembly of the transducer since the piezoelectric element can be installed regardless of the relative location of the individual disk elements.

According to a further feature of the invention in connection with the last-mentioned design the two collector electrodes and such intermediate electrodes as may have been provided are conveniently made of the same type with a perforation laterally offset towards the center of the axis. In that case, the electrode closest to the bottom of the prestressing sleeve need only be turned about 180° in relation to the rest of the electrodes whose perforations are brought into alignment with each other, so that the single conductor attached thereto is allowed to emerge in a straight line through the perforations of the other electrodes.

The following advantageous embodiment of the invention is particularly practical where the measuring element of the transducer consists in a manner known per se of disks made of some piezoelectric material with both faces even and metal-coated for the formation of electrodes, one of the two metal coatings presenting a recess originating with the rim of the disk, an electric connecting bridge electrically connected with the other metal coating but electrically insulated from the first-mentioned metal coating terminating in the said recess. According to the invention the uppermost disk facing the abutment is of identical design, the metal coating of this surface as well as the end of the connecting bridge each being connected with one of the two single conductors leading to the connections of the measuring leads. This design offers the advantage of rendering perforation of the disks of piezoelectric material superfluous without, however, increasing the overall dimensions of the transducer. The end of the connecting bridge may either extend as far as the center of the disk or terminate short of the said center, the charge being correspondingly connected by means of two concentric or two eccentric conductors extending through a concentric or two eccentric axial bores of the abutment.

Further details of the invention will appear from the following description of several embodiments of the invention with reference to the accompanying drawings in which.

Figure 1:
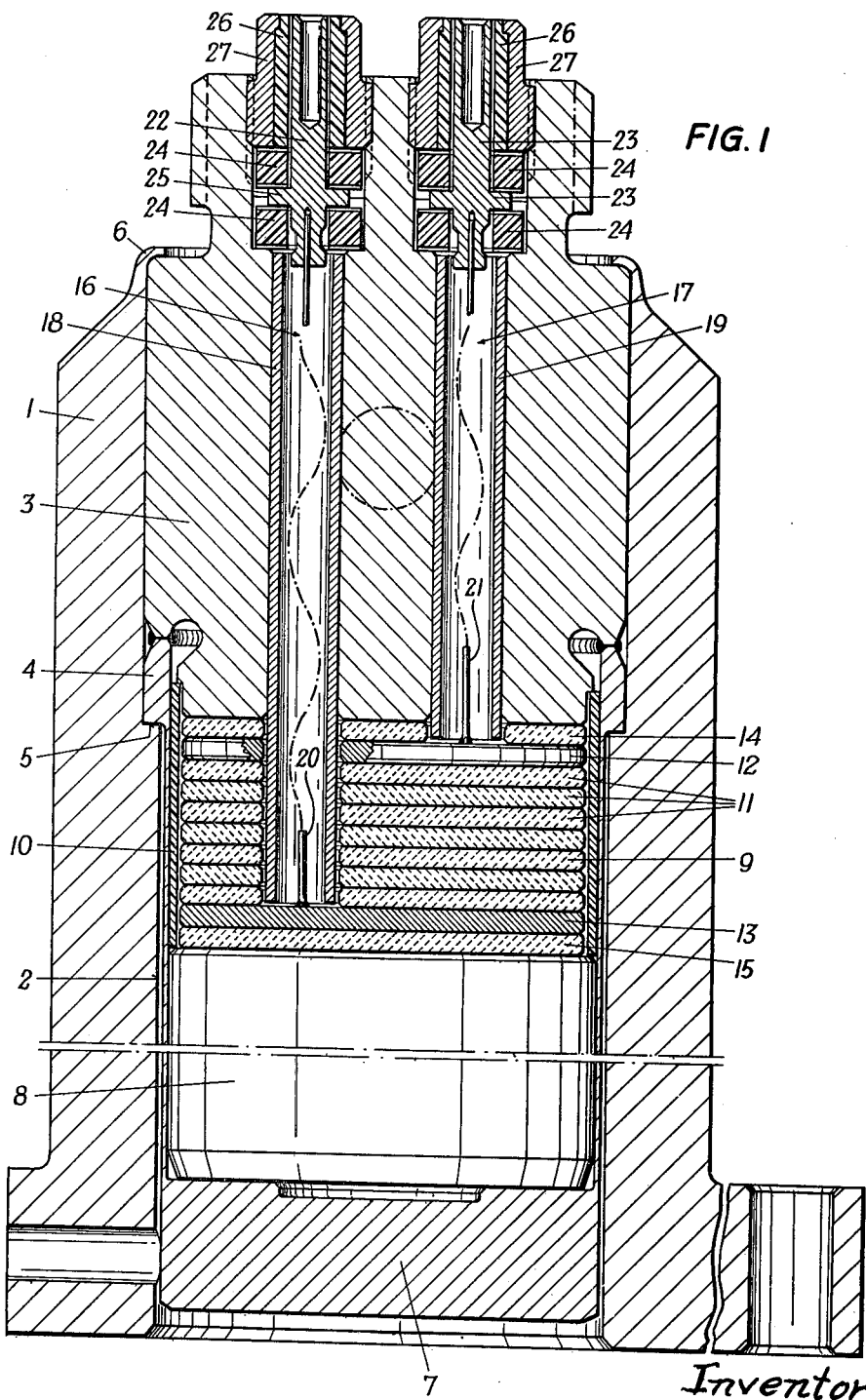
FIG. 1 shows an axial sectional view of a piezoelectric accelerometer.

Referring to FIG. 1, reference number 1 designates the essentially hollow cylindrical housing of the transducer, in the stepped-down central bore 2 of which an abutment 3 in the shape of a cylindrical insert forming a plurality of steps is arranged. An elastic prestressing sleeve 4 is welded to the abutment 3, the said prestressing sleeve resting with its flange 4' on the annular reduction 5 of the central bore 2 of the housing 1. The abutment is maintained in position on top by means of the beaded rim 6 of the transducer housing 1.

The prestressing sleeve 4 is loosely arranged with a radial clearance inside the narrow portion of the stepped-down central bore 2. Inside the prestressing sleeve 4 a cylindrical seismic mass 8 directly adjoining the bottom 7 of the prestressing sleeve 4 is located, whose mass forces act in conjunction with the mass forces of solid bottom 7 on the piezoelectric measuring element 9 located in the prestressing sleeve 4 between the mass 8 and the abutment 3. The centered measuring element 9 which is electrically insulated against the shell of the prestressing sleeve 4 by means of an insulation sheath 10 made of Teflon for example, comprises a plurality of superimposed disks 11 of piezoelectric material, such as quartz, for example. For the collection of the electric charge of the piezoelectric element 9 disk-shaped collector electrodes 12 and 13 adjoining its two front faces are provided, the said electrodes being electrically insulated against the inner surface of the abutment 3 and the mass cylinder 8.

The abutment 3 is provided with two parallel through bores 16 and 17 extending in a longitudinal direction, the bore 16 being continued by aligned bores of the insulating disk 14, of the electrode 12 and the disks 11 and terminating at the electrode 13. The other longitudinal bore 17 extends only through the insulating disk 14 and terminates in front of the electrode 12 adjoining the abutment 3. Electrically insulating through tubes 18 and 19 are inserted in the bores 16 and 17, respectively. Single conductors 20, 21 are conductively attached, such as by welding for example, to the faces of the electrodes 13 and 12 respectively, exposed in the direction of the longitudinal bores 16 and 17. These single conductors extend through the insulating tubes 18 and 19 respectively, as shown in the drawing by dash-and-dot lines, with an excess length as far as the connecting bushes 22 and 23 and are conductively connected with the former. These connecting bushes 22 and 23 are inserted in an enlarged portion of the bores 16 and 17 respectively, with two insulating rings 24 inserted between each of them, the said insulating rings resting on the two annular surfaces of a collar 25 provided on the connecting bushes. Collets 27 screwed into the inside thread of the bores 16 and 17 and provided with an insulating insert 26, provide a firm hold for the two connecting bushes 22 and 23 in the bores 16 and 17. The connecting bushes 22 and 23 serve for the connection of a two-pole measuring lead (not shown) through which the charge collected from the piezoelctric element 9, is fed to a measuring or recording instrument, preferably via an amplifier.

Figure 2:
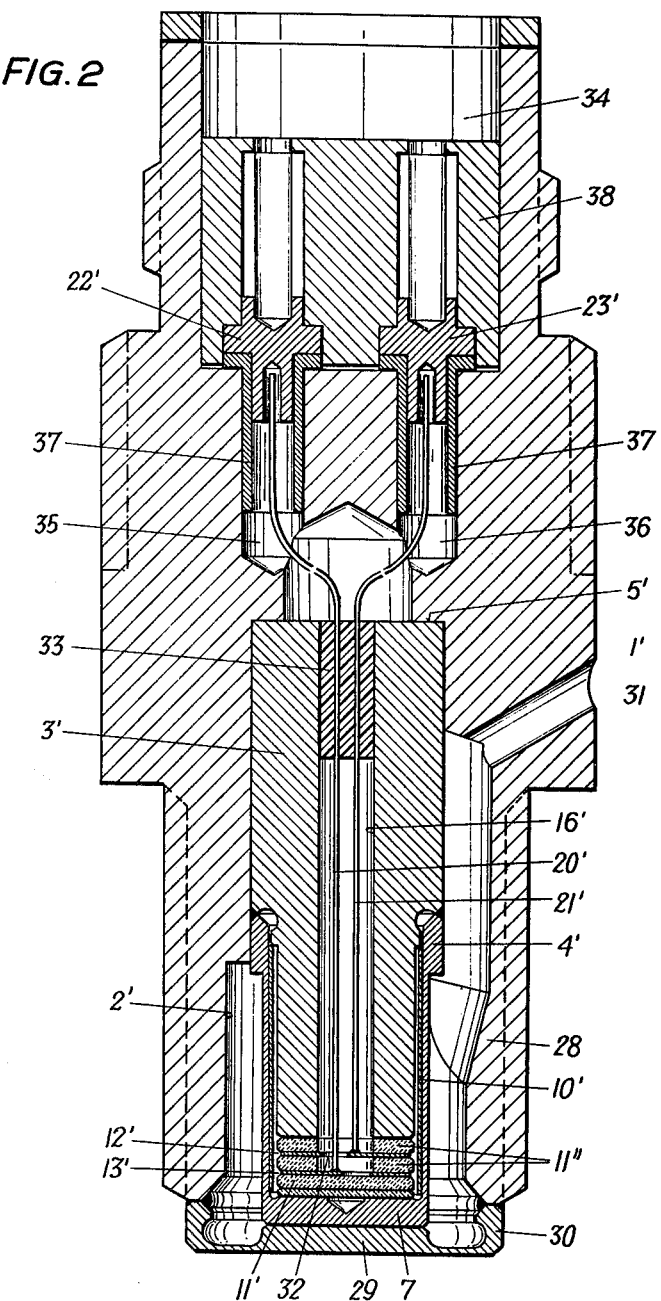
FIG. 2 is an axial section of a piezoelectric pickup.

Referring to the piezoelectric transducer illustrated in FIG. 2, the transducer housing 1' terminating at one of its extremities in a threaded sleeve 28 comprises an axial blind-end bore 2' forming a plurality of steps wherein the abutment 3' with the prestressing sleeve 4 welded thereto is inserted. The end face of the abutment 3' rests on an annular reduction 5 of the blind-end bore 2'. The bottom of the prestressing sleeve 4 designated by reference number 7' is in surface contact with a membrane 29 welded with its annular rim 30 to the annular front face of the threaded sleeve 28.

The annular space formed between the prestressing sleeve 4 and the bore 2' is connected with the open air via a vent line 31.

Between the bottom 7' of the prestressing sleeve 4 and the front face of the portion of the abutment 3' protruding far into the prestressing sleeve, the measuring element composed of three disks of piezoelectric material is located with the interposition of two disk-shaped collector electrodes 12' and 13', and electrically insulated against the shell of the prestressing sleeve 4 by means of an insulation sheath 10'. The disk 11' closest to the bottom 7' of the prestressing sleeve 4' is of the solid type, whereas the other disks 11" of the measuring element are axially perforated in the center. The bores are in alignment with an axial longitudinal bore 16' of the abutement 3' through which two insulated single conductors 20' and 21' extend. The conductor 20' extending through the electrode 12' presenting an eccentric perforation 32 is conductively connected with the electrode 13' such as by welding. The other single conductor 21' is connected with the electrode 12' in a similar manner. The two conductors are tightly fixed in the bore 16' by means of a sealing plug 33 made of some sealing compound.

On the side facing the membrane 29 the transducer housing 1' presents an axial cylindrical recess 34 at the bottom of which two parallel blind-end bores 35 and 36 are provided which terminate in the central blind-end bore 2' by intersection. Inserted in each of the bores 35 and 36 is an insulation sheath 37 resting with a collar on the bottom of the cylindrical recess 34. Inserted in the insulation sheaths 37 are connecting bushes 22' and 23' respectively, maintained in position on the housing 1' by means of an insulator 38 located in the recess 34 and provided with offset bores receiving the plug sockets of the connecting bushes 22' and 23' The ends of the insulated conductors 20' and 21' are close to the connecting bushes 22' and 23' and conductively connected with the latter. With this embodiment of the invention too, the electric charge supplied by the measuring element is fed to the measuring or recording instruments via a two-pole measuring lead (not shown).

The following description of several embodiments of the invention serves only to illustrate essential component parts of the transducer which may either be an accelerometer or a pickup.

Figure 3:
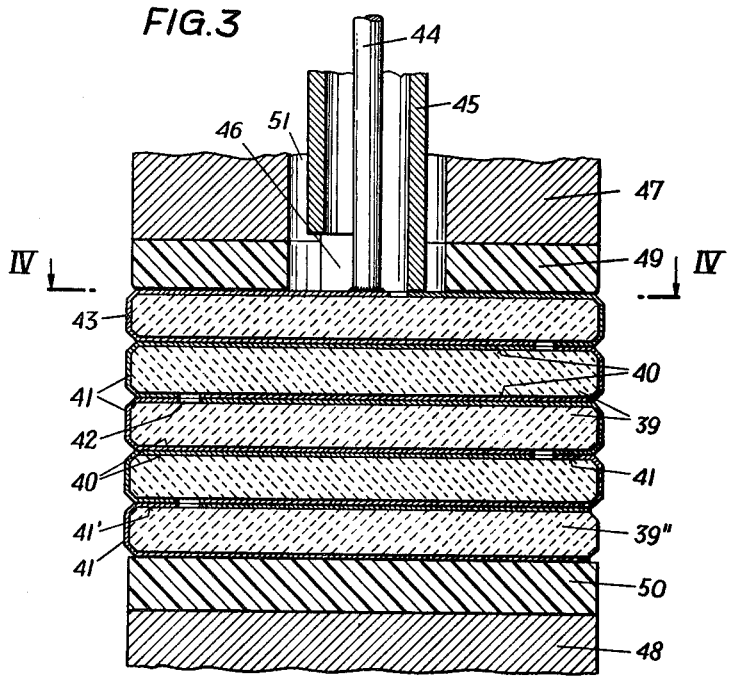
FIG. 3 is a cross-sectional view of another variant of the transducer according to the invention.
Figure 4:
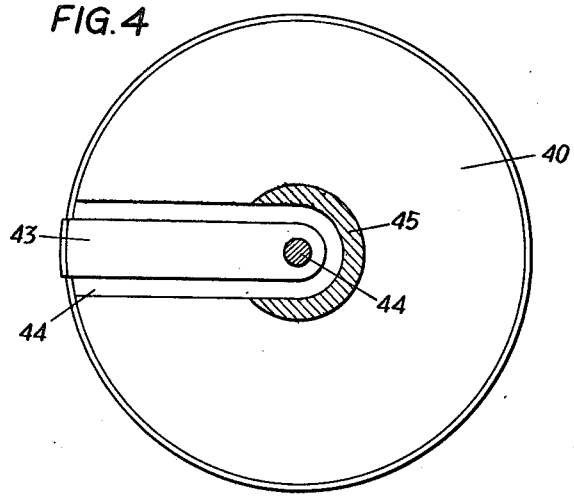
FIG. 4 is a cross-sectional view on line IV—IV of FIG. 3.

The measuring element illustrated in FIGS. 3 and 4 comprises three disks 39 and a topmost disk 39' and a bottommost disk 39" of piezoelectric material, such as quartz. The disks 39, 39' are provided with metal coatings 40, preferably of gold or silver serving as electrodes on their main surfaces. These metal coatings may be applied by vaporization or similar processes. Furthermore, the disks 39 and 39′ comprise U-shaped electrical connecting bridges in two places offset by an angle of 180° in relation to each other on their sides, each of the said connecting bridges being conductively connected with one extremity with another of the two metal coatings 40. With the other extremities 41′ the connecting bridges engage recesses 42 of the second metal coating 40, while being electrically insulated from the latter by an allaround clearance. The individual disks 39 are superimposed in such a manner that homopolar electrodes are adjacent and the heteropolar electrodes located at a distance from each other equalling double the thickness of a disk, are conductively connected with each other by means of connecting bridges 41 which are placed with their extremities 41′ on top of each other. The bottommost disk 39″ has only one connecting bridge 41. The uppermost disk 39′ comprises a connecting bridge 43 terminating in a recess 44 of the uppermost metal coating 40 and extending as far as the center of the disk. The charges are collected by means of a neutrally arranged conductor 44 and a conductor tube 45 arranged in coaxial relation thereto and directed outwards. The conductors 44, 45 are either directly attached to or applied against the connecting bridge 43 and/or the metal coating 40. In the area of the connecting bridge 43 the tubular conductor 45 presents an appropriate recess 46.

The piezoelectric disk assembly hereabove described is clamped between the abutment 47 and the prestressing sleeve 48, with disks 49 and 50 respectively of an electrically insulating material inserted in between. Both the abutment 47 and the insulating disk 49 have an axial bore 51 through which the conductors 44, 45 extend.

In the embodiment of the invention shown in FIG. 5 all component parts of the measuring element are of equal design and designated by the same reference numbers as described with reference to FIGS. 3 and 4, except for the uppermost disk 52 where the connecting bridge 53 leading to the lower metal coating 40 terminates in the recess in front of the disk center. The two eccentrically arranged conductors 55, 56 for the collection of charges attached to the connecting bridge 53 and/or to the metal coating 40 serving as a collector electrode extend through the abutment (not shown) and the interposed insulating disk 57 in bores 58 and 59, respectively.

Figure 5:
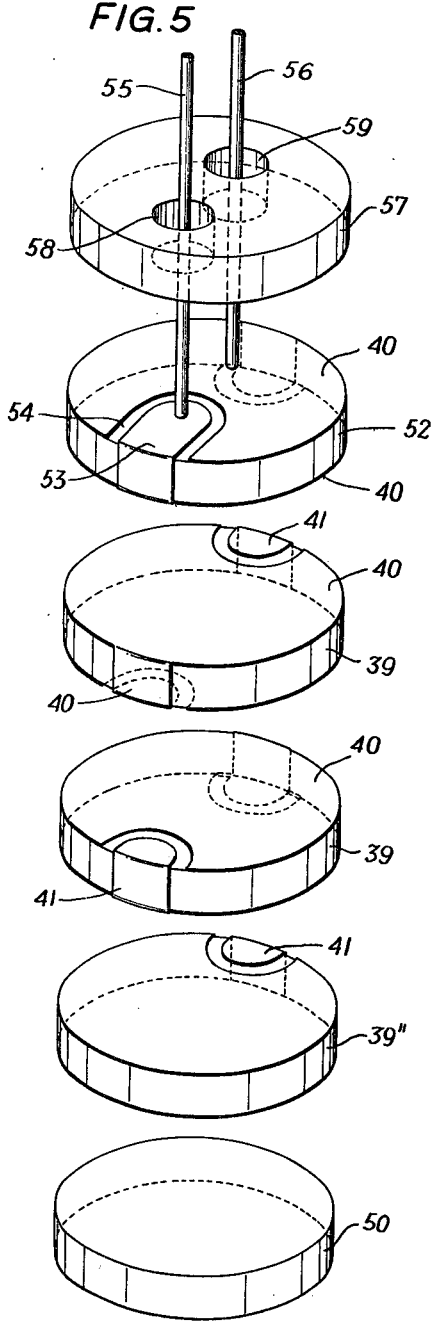
FIG. 5 is an exploded perspective view of the various elements of a piezoelectric disk-assembly.
Figure 6:
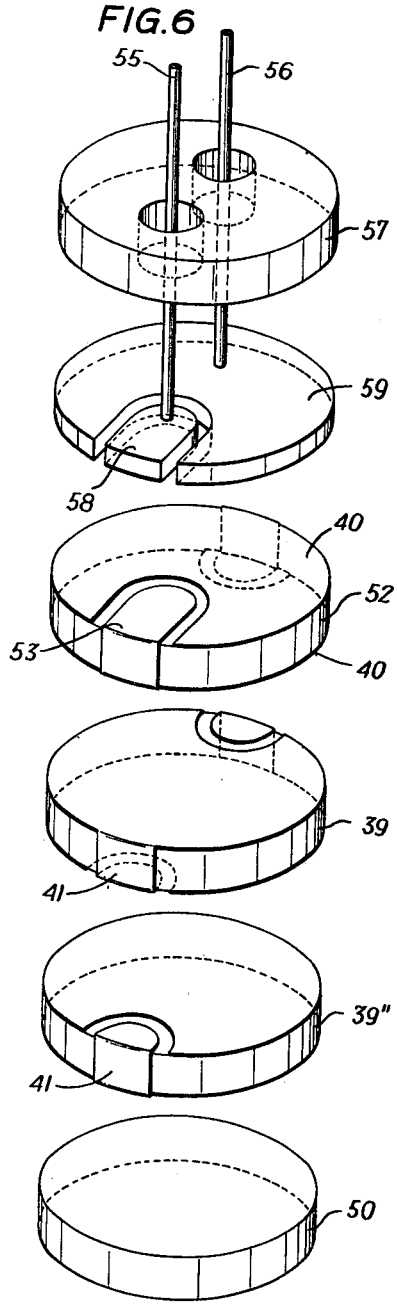
FIG. 6 is another type of piezoelectric disk-assembly in the same view as FIG. 5.

The embodiment of the invention illustrated in FIG. 6 differs from the one shown in FIG. 5 merely insofar as for the collection of the charges from the connecting bridge 53 and the uppermost metal coating 40 intermediate electrodes 58 and 59 respectively, are provided and may be positively connected with the piezoelectric disk assembly.

We claim:
1. A piezoelectric transducer comprising a measuring element adapted to be subjected to the forces to be measured and consisting of superimposed disks of a piezoelectric material, an abutment supporting the measuring element, an insulating sleeve surrounding the outer surface of the measuring element, a prestressing sleeve encompassing the measuring element together with the said insulating sleeve and having a bottom at one of its ends, the said prestressing sleeve being positively connected with the said abutment, the measuring element being axially prestressed between the abutment and the bottom of the prestressing sleeve, a housing containing the said prestressing sleeve, the measuring element comprising at least two electrodes collecting the electric charge produced by the forces to be measured and insulated against the said housing and the prestressing sleeve and the abutment, two electric conductors likewise insulated electrically from the housing and each with one end conductively connected to the front end of the said electrodes facing the external connections, at least one longitudinal through bore provided in the said abutment in alignment with the connection between the said conductor and the electrodes and the said conductors extending through the perforated abutment and each of them conductively connected with one of the said external connections.

2. A piezoelectric transducer according to claim 1, wherein the said longitudinal through bore traverses the abutment through the center thereof and includes the two said conductors, the said measuring element having a bore in alignment with the longitudinal bore, the first-mentioned bore terminating at the electrode closer to the bottom of the prestressing sleeve, and the electrode farther distant from the bottom of the prestressing sleeve having a perforation through which the conductor connected to the first-mentioned electrode emerges freely.

3. A piezoelectric transducer according to claim 1, wherein two parallel longitudinal bores are provided arranged in an eccentric relation to the central axis of the abutment, each of the said bores containing one of the said two conductors, the said measuring element having two bores each of them in alignment with one of the said longitudinal bores, one of the first-mentioned bores terminating at the electrode closer to the bottom of the prestressing sleeve and the other bore at the electrode farther distant from the bottom of the prestressing sleeve, and in which two insulating tubes are provided which are inserted in the said longitudinal bores and extend in the said bores of the measuring element as far as the said electrodes.

4. A piezoelectric transducer according to claim 1, wherein the two plane ends of the said disks of a piezoelectric material carry a metal layer, one of the two metal layers having a recess extending from the periphery of the disk, and in which an electrically conductive connecting bridge is provided which extends from the metal layer at the opposite end of the disk and terminates in the said recess and being electrically insulated from the first-mentioned metal layer, one of the said two conductors being connected to the metal layer at the abutment end of the disk closest to the abutment, and the other conductor being connected to the said connecting bridge.

5. A piezoelectric transducer according to claim 4, wherein the extremity of the connecting bridge at the abutment end of the disk closest to the abutment extends as far as the middle of the said disk, and the two conductors, one of which is of tubular design, are arranged in concentric relation to each other.

6. A piezoelectric transducer according to claim 4, wherein the extremity of the connecting bridge terminates at the abutment end of the disk closest to the abutment, the said abutment having two eccentric longitudinal bores through each of which one of the said two conductors extends and one of the conductors being connected to the said connecting bridge and the other conductor to the said metal layer.

References Cited

UNITED STATES PATENTS

| | | | |
|---|---|---|---|
| 2,846,496 | 8/1958 | Baumgartner | 310—8.7 |
| 2,894,317 | 7/1959 | Marks | 310—8.7 |
| 3,031,591 | 4/1962 | Cary | 310—9.1 |
| 3,171,989 | 3/1965 | Hatschek | 310—8.9 |
| 3,281,613 | 10/1966 | Hatschek | 310—9.8 |
| 3,290,595 | 12/1966 | Novotny | 310—8.1 |
| 3,322,980 | 5/1967 | Faure | 310—8.9 |
| 3,349,259 | 10/1967 | Kistler | 310—8.4 |
| 3,390,287 | 6/1968 | Sonderegger | 310—8.4 |
| 3,390,286 | 6/1968 | Gradin | 310—9.1 |

J D MILLER, Primary Examiner

U.S. Cl. X.R.

310—8.6, 9.1